May 26, 1925.

R. S. BOLGER

WINCH FOR MOTOR VEHICLES

Filed Dec. 26, 1924 5 Sheets-Sheet 1

1,538,923

INVENTOR
Robert S. Bolger

May 26, 1925. 1,538,923
R. S. BOLGER
WINCH FOR MOTOR VEHICLES
Filed Dec. 26, 1924 5 Sheets-Sheet 2

Inventor
Robert S Bolger

May 26, 1925.
R. S. BOLGER
1,538,923
WINCH FOR MOTOR VEHICLES
Filed Dec. 26, 1924   5 Sheets-Sheet 3
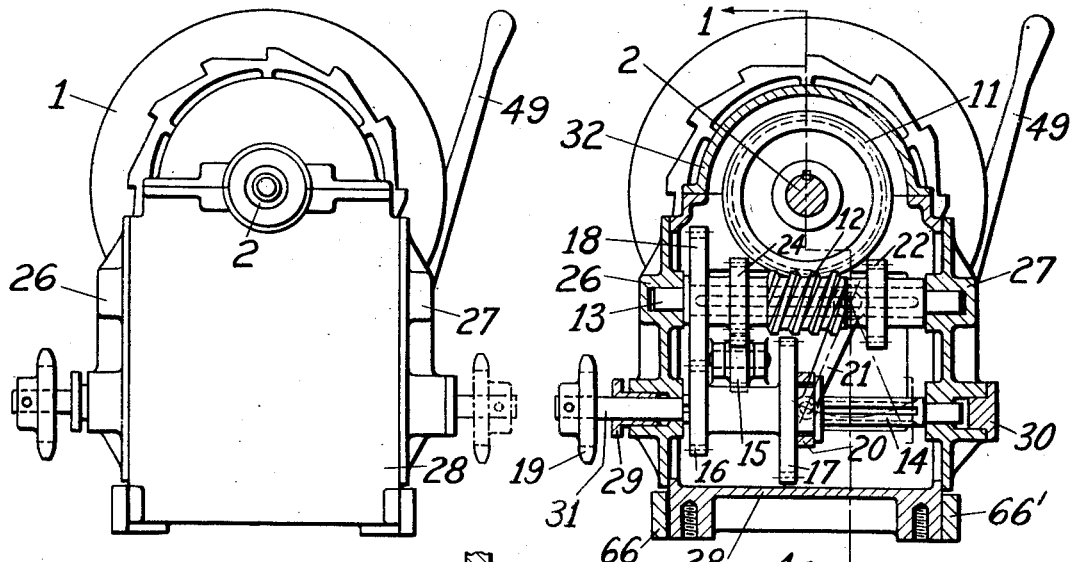
Fig. 4        Fig. 5
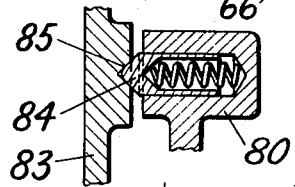
Fig. 7
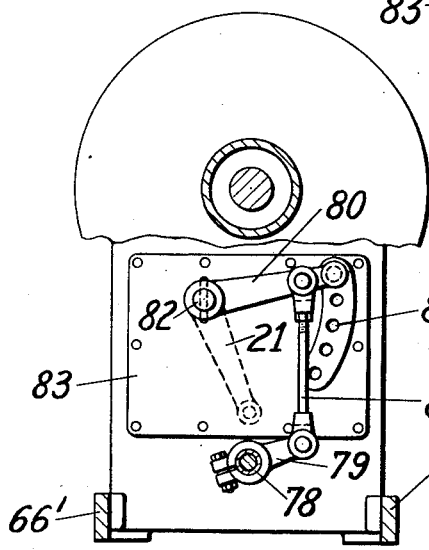
Fig. 6
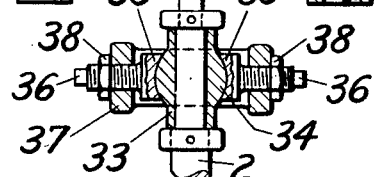
Fig. 8
Fig. 9
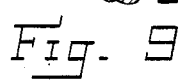
INVENTOR
Robert S. Bolger May 26, 1925.  R. S. BOLGER  1,538,923
WINCH FOR MOTOR VEHICLES
Filed Dec. 26, 1924   5 Sheets-Sheet 4

LOW GEAR

REVERSE GEAR

HIGH GEAR

Inventor
Robert S. Bolger

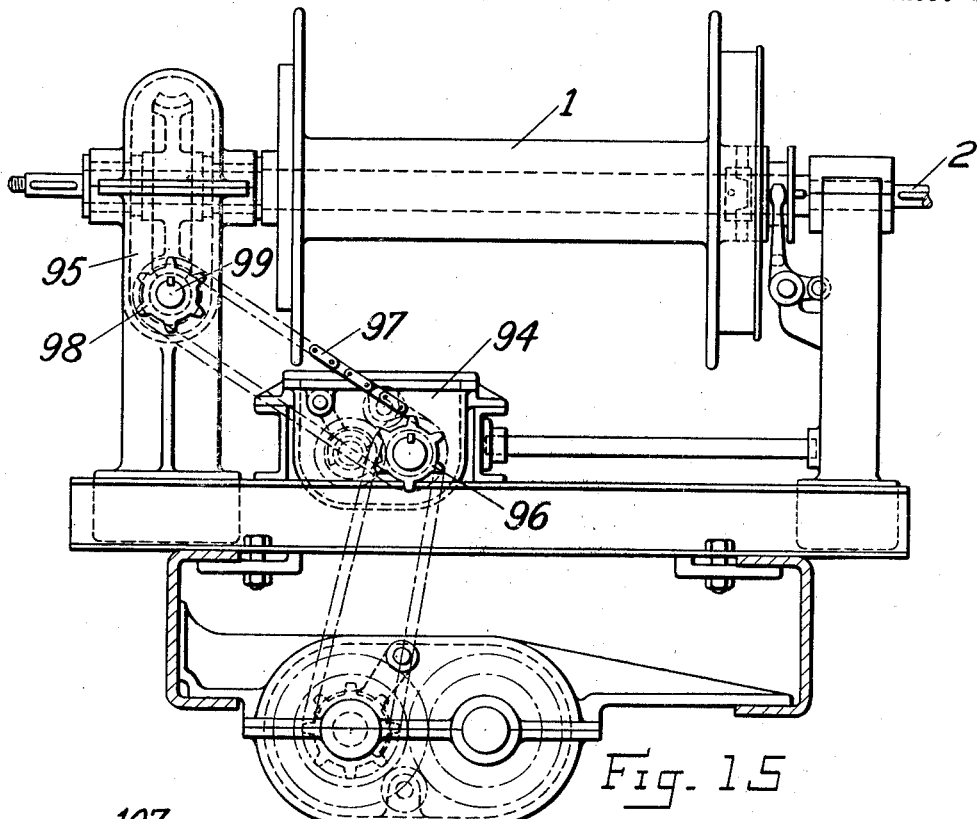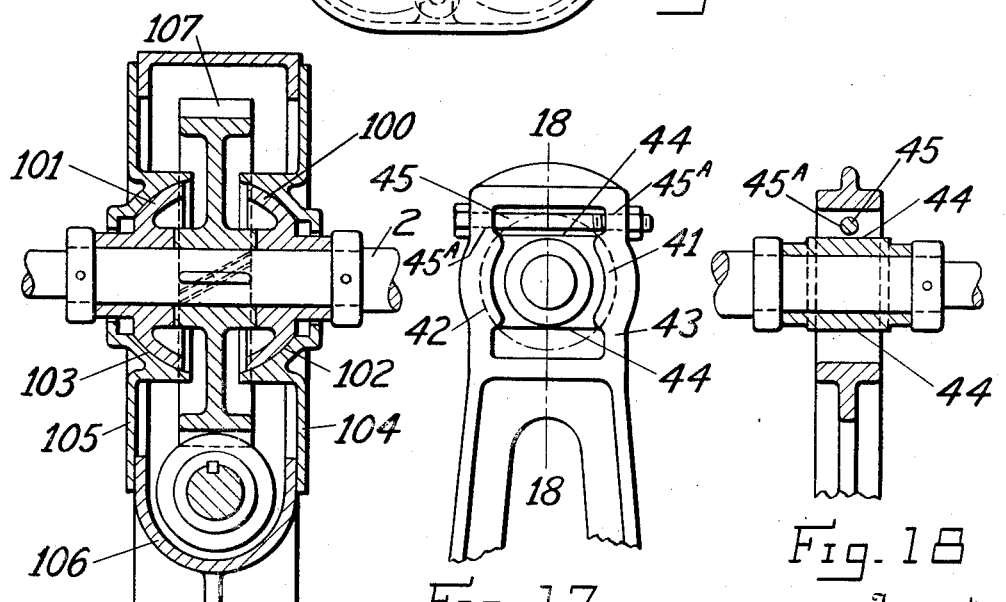

Patented May 26, 1925.

1,538,923

UNITED STATES PATENT OFFICE.

ROBERT S. BOLGER, OF NEW YORK, N. Y.

WINCH FOR MOTOR VEHICLES.

Application filed December 26, 1924. Serial No. 758,310.

*To all whom it may concern:*

Be it known that I, ROBERT S. BOLGER, a citizen of the United States, residing in the city of New York, in the county of New York and the State of New York, have invented certain new and useful Improvements in Winches for Motor Vehicles, of which the following is a specification.

The application of winches to motor vehicles has brought with it the problem of varying the speed and direction of rotation of the winch drum to adapt it to various loads and jobs. Almost universally, it has been the practice to drive the winch from the lay-shaft or power-take-off-shaft of the main engine transmission. This of course had the disadvantage of providing but one speed and direction of rotation for the winch drum. One method that has been employed to obtain this desired flexibility in operation, consists in splitting the drive shaft and driving the winch from the main engine transmission, first disconnecting the rear wheels. This, although looked upon with disfavor by all automotive engineers, has been the only practical expedient available. Other methods have been suggested but they are either too complicated and costly or impractical from an engineering point of view. Quite recently a second transmission has been installed and driven from an extension of the lay shaft of the main engine transmission and the winch driven from this second transmission.

But with the split drive and with the latter mentioned method, extensive alterations must be made in the design of the truck or other motor vehicles. In fact the auxiliary units and modifications and their installation cost more than the winch and the second transmission as the case may be. But even more objectionable is the fact that it requires the facilities of the factory to install the winch. This means that the truck must be designed and built and used as a motor winch truck and not as a stock chassis.

The need has long been felt for a variable speed winch that would be easily installable as a unit on any motor chassis and which would be less expensive than the types now in use. It is the main object of this invention to provide a winch that would be easily mountable on and dismountable from any truck chassis.

Another object of my invention is a winch, and the variable speed mechanism therefor integrally constructed and installable as one unit on any standard truck chassis with but minor additions thereto.

Another object of my invention is to provide means for driving the winch and the transmissions therefor from the main drive shaft.

Another object of my invention is to prevent binding between the drum shaft and the bearings therefor, irrespective of the weaving of the chassis and distortion of the housings or frames.

Another object of my invention is to provide a brake means for the winch drum, operable both from the truck deck and from the cab.

Another object of my invention is to devise a self-aligning bearing.

Other objects of my invention will be apparent from the drawings and the following description.

In the accompanying drawings:

Fig. 4 is a side elevation of a winch showing the housing for the gearing.

Fig. 5 is a vertical section through the gearing on the line 5—5 of Fig. 1.

Fig. 6 is a vertical section on the line 6—6 of Fig. 2, showing the outside gear shifting mechanism.

Fig. 7 is a fragmentary section, enlarged to show the gear locking mechanism of the gear shift lever.

Fig. 8 is a sectional elevation on line 8—8 of Fig. 2 showing one type of the self-aligning bearing.

Fig. 9 is a plan section on the line 9—9 of Fig. 8.

Fig. 15 is a rear elevation of a modification of the winch mounted on the truck chassis.

Fig. 16 shows a self aligning bearing for the worm-gear end of the drum shaft.

Fig. 17 shows a modification of the self aligning bearing shown in Figs. 8 and 9.

Fig. 18 is a vertical section of Fig. 17 on line 18—18 of Fig. 17.

Figures 1, 2:
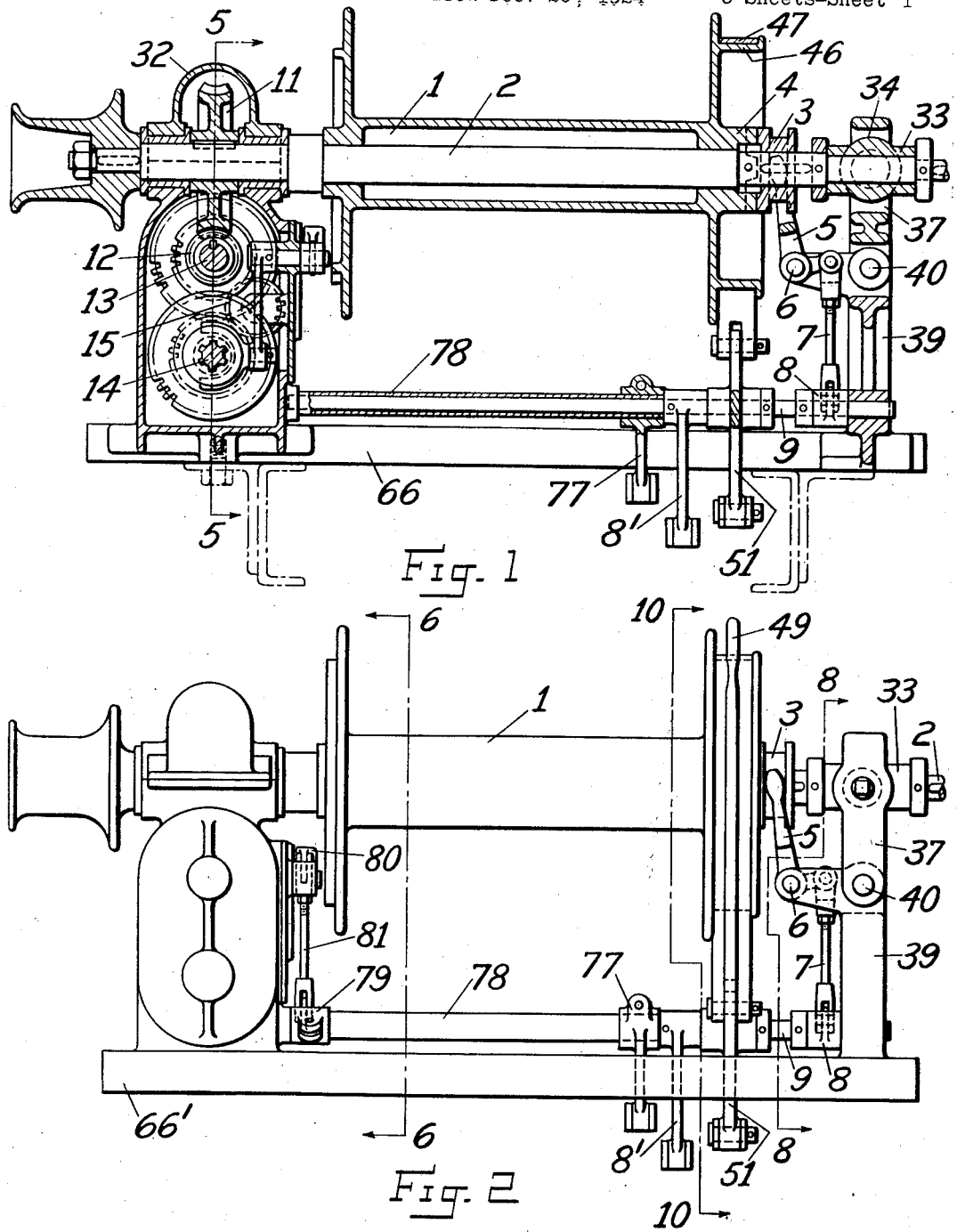
Fig. 1 is a vertical section through the winch on the line 1—1 of Fig. 5.
Fig. 2 is a rear elevation similar to Fig. 1.

In the preferred form of the winch movable and installable as a unit as shown in Figs. 1 and 2 the winch comprises a drum 1 which is free to rotate around the shaft 2 when the clutch member 3 is disengaged from the clutch member 4 of the drum 1 by means of the fork 5 which fulcrums on the pin 6. The fork is actuated by the rod 7 connected to the lever 8 fast upon the rock shaft 9, which is in turn actuated by the lever 8′ fast on shaft 9 which is again actuated (see Fig. 3) by rod 9′ connected to the hand lever 10 fulcrumed in the bracket 73.

Figure 11:
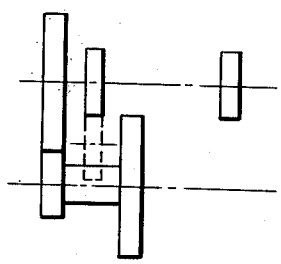
Figs. 11–12–13 are diagrammatic views showing the relationship of the gears for three driving positions.
Figure 12:
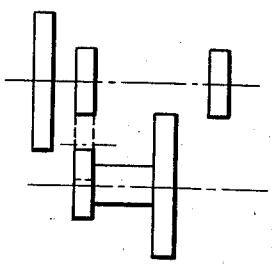
Figure 13:
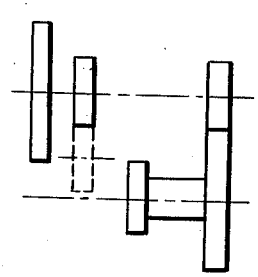

When the clutch members 3 and 4 are in engagement, the shaft 2 which has the worm gear 11 keyed thereon, will drive the drum 1 when the worm 12 on the shaft 13 is rotated by engaging any of the companion gears on the spline shaft 14 or the reverse idler 15 of the change speed gears shown more clearly in Fig. 5. In this view, gears 16 and 17, shiftable as a unit, are shown in position to drive gear 18, which is keyed on the worm shaft 13 as are also the gears 24 and 22. Gear 16 is of less diameter than 18, so that when they are in mesh the worm shaft 13 is driven at a less speed than the spline shaft 14 which is driven by the sprocket 19 fast on the outer end of the spline shaft. To drive the worm shaft 13 at a greater speed than the spline shaft 14, the gears 16 and 17 are caused to slide along the spline shaft 14 by means of the fork 20 on the end of the lever 21 until the larger gear 17 is in mesh with the smaller gear 22. If a reverse rotation of the winch drum is desired, the gear 16 is shifted into line with the reverse idler 15 which drives the gear 24 fast on the worm shaft 13. Since the worm is also fast on the shaft 13, the worm is driven either at a low, or high speed or in a reverse direction in accordance with the positions of the various gears as explained above and as illustrated diagrammatically in Figs. 11–12–13. If additional speeds are required, it is only necessary to add the proper gears to the transmission.

The worm shaft 13 is mounted in the end-bearings of the housing covers 26 and 27 of the frame type housing 28. The spline shaft is mounted in the lower bearings of the covers 26 and 27, said bearings being adapted to receive either the stuffing gland 29 or the dead end cap 30, thus allowing the end 31 of the spline shaft to protrude from either end to receive a sprocket for various types of drive.

The frame housing 28, the covers 26 and 27 and the top cover 32 form a complete enclosure for all the gears allowing them to run in a bath of oil and to be protected from dirt and dust.

Due to distortions produced by weaving of the chassis frame during driving or because of the non-level ground on which the truck must stop to perform its job, this may often be a deep ditch or gulley, a bind is produced upon the drum shaft and its bearings. This bind may come as a result of the distortion of frame or of the shaft and the frame. The solution of this difficulty is in the invention of novel bearings and bearing housings which compensate for distortions that occur in the shaft and in the housing. I am aware that self aligning shafts are old. But in this invention the advantages of the cylindrical bearing surfaces is maintained and the wearing surfaces of the bearings themselves made to follow the shaft and at all times to remain parallel to them and the housing for the bearings made to automatically compensate for any distortions. I am aware that other equivalents for this method of compensating for the distortions in the particular case of the winch can be used. The important thing is to provide these compensating means to the shaft distortion in order to prevent binding. The method and means illustrated in Figures 1, 2, 8, 9, 16, 17, 18 are great advantages and are the preferred modification of a self aligning bearing and its application to a winch for motor vehicles. It is obvious that such self aligning bearings are of wide general application in many types of line-shafting and machines wherein shafts or housings or hangers are subject to distortional forces.

In Figs. 1, 2, 8, and 9, is shown the application of one modification to the winch. Mounted on the shaft 2, on the side opposite to that on which the gears are mounted, and encircling the said shaft is a bearing 33 having a bearing surface in which the shaft is journaled and an exterior spherical portion 34 which fits into concave spherical ends 35 of the studs 36, which are locked in the frame 37 by means of the nuts 38. The frame 37 is pivotally mounted by means of the center pin 40 on the side frame 39, which is connected to the gear housing by means of the tie rods 66 and 66′. It will be readily understood that any distortion of the rotating parts of the winch which would normally tend to put a bind on the shaft 2 and the bearing would be compensated due to the universal action of the ball and socket construction, the bearing following the shaft and maintaining a perfect alignment at all times. The socketed studs allow an easy and accurate centering of the bearing. Any distortion in the frame tending to cause variations in the distance between the parts thereof would also tend to cause a bind and this is compensated by the swinging of the frame 37 which would compensate any such distortion.

In the modification shown in Figs. 17 and 18, the sockets into which the spherical external surface of the bearing fits are made integral with the bearing housing. The concave spherical surfaces 42 are formed in the frame 43. The exterior spherical portion 41 of the bearings is slabbed off at the top and bottom so that the exterior surface instead of being that of a sphere is the zone of a sphere thus forming two circular surfaces 44. To fit the convex surfaces 41 into the concave surfaces 42, the bearing is entered with the surfaces 44 vertical and the bearing given a quarter turn. The bolt 45 is then slipped into the bore holes 45$^a$ in the frame 43, and tightened in place. The distance between the bolt and the surfaces 44 is such as to allow less than a quarter turn of the bearing, the latter is thus locked against removal. The friction between the spherical surfaces is such that they are stationary except under distortional forces.

Under certain extreme cases of distortion it is at times advisable to provide for self-alignment of the bearing at the power in-put end of the shaft 2. To provide for this the method of mounting the worm gear as illustrated in Fig. 16 may be employed. The worm gear 107 is fast on the shaft 2 between the two cap shaped bearing members 100 and 101 in which the shaft 2 rides. The wearing surfaces 102 and 103 ride in concave spherical receiving surfaces constructed integrally of the gear housing closure members 104 and 105 fastened to the housing 106. The hub of the worm gear 107 acts as a spacer between the members 100 and 101. Any distortion will be compensated by the universal action of the ball and socket construction. Where this construction is employed it will be necessary to take care of any crowding of the worm and worm gear, when the latter is tilted in relation to the former. This may be done by the use of a straight faced worm or by providing some lost motion between the worm and worm gear. This lost motion is very often provided on a worm gear drive to prevent any possibility of crowding due to distortion.

Figures 10, 14:
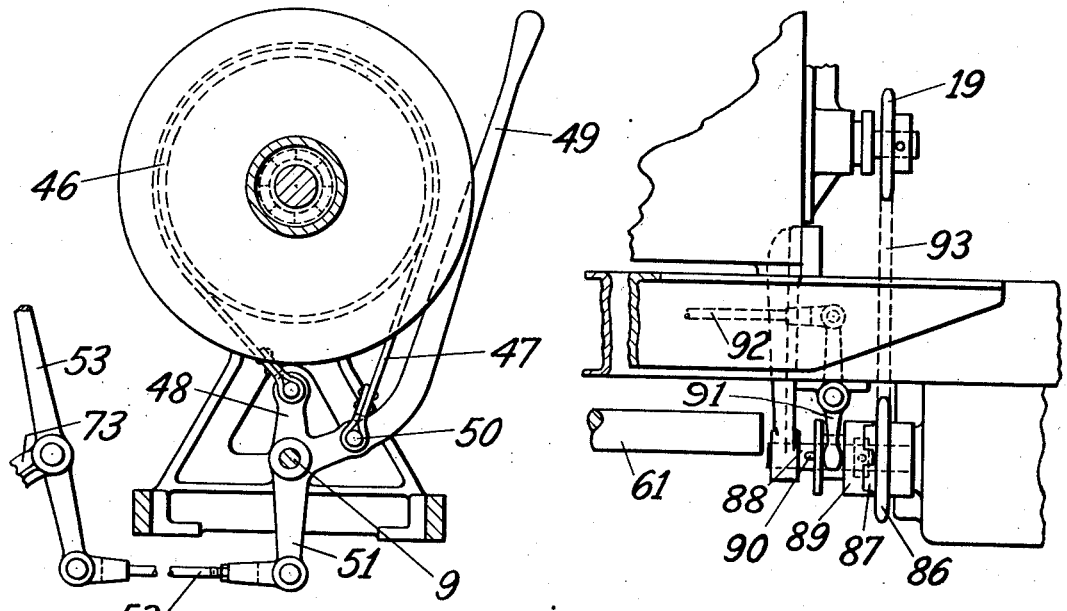
Fig. 10 is a vertical sectional elevation on the line 10—10 of Fig. 2 showing the brake operating mechanism.
Fig. 14 shows a modification for the winch drive alternative to that shown in Fig. 3.

Figure 10 shows a preferred braking means for the drum shaft. Fast on the drum 1 and integral therewith is provided a cylindrical brake surface 46, surrounded by a brake band 47. One end of this brake band is connected to the brake lever 48; the other end of 47 being connected to the hand lever 49 at the point 50. The lower end of the combination lever 48 and 49 is provided with an arm 51 loosely fulcrumed on the rock-shaft 9 of the winch. The arm 51 is connected by means of the rod 52 with the hand lever 53, which is preferably located in the cab of the vehicle. This hand-lever 53 is loosely fulcrumed on the bracket 73. By this arrangement the drum can be braked from either the cab or from the platform of the truck, an arrangement which has decided advantages, since it is often necessary to brake the drum when but one man, i. e. either in the cab or on the platform is available. Very often, emergencies arise, and this double braking means insures safety. Other advantages of this two way braking means will be apparent to those skilled in the art.

Figure 3:
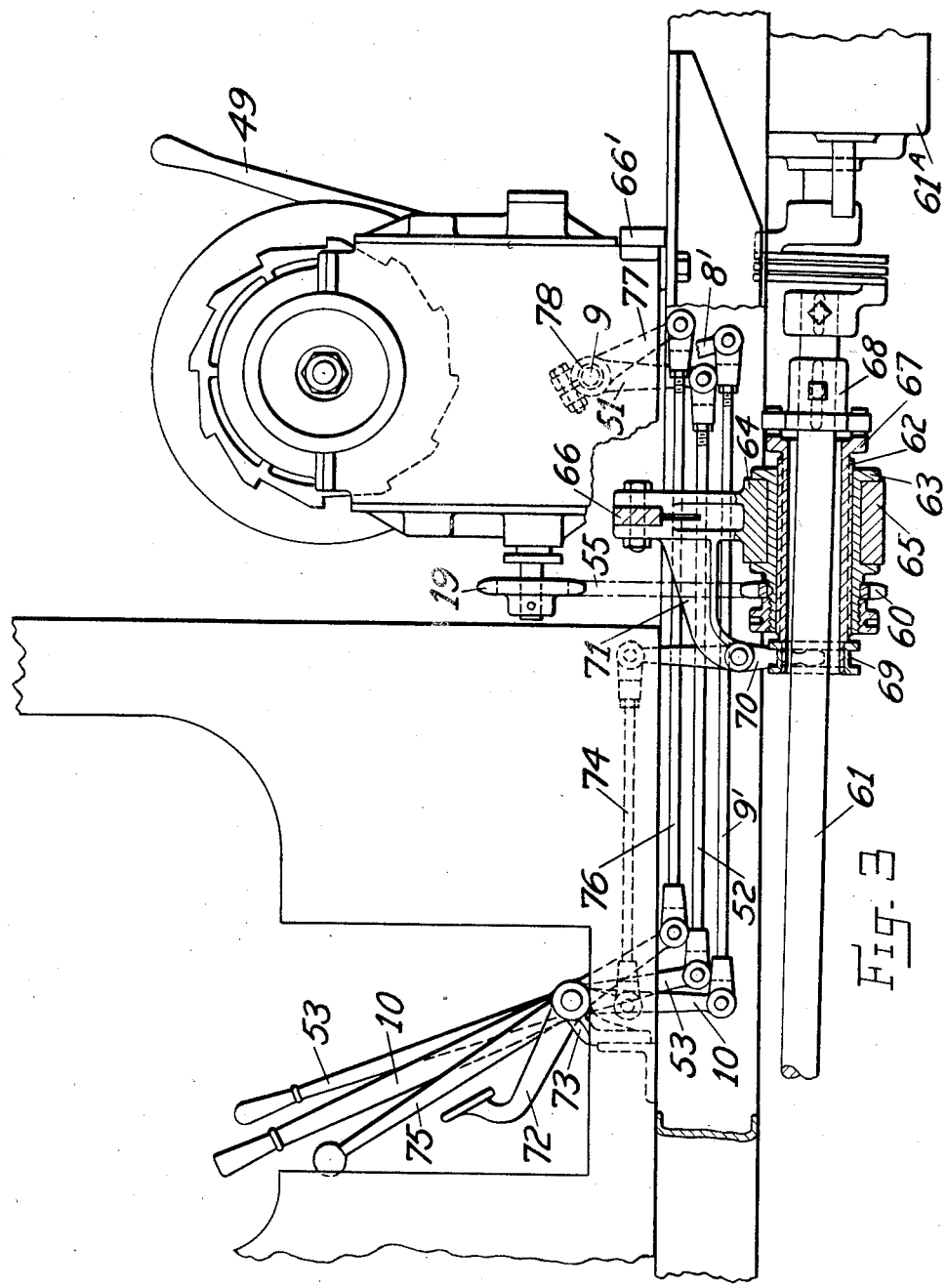
Fig. 3 is a side elevation showing the winch mounted on the chassis frame and one type of drive mechanism partly in section.

Figure 3 shows the preferred method of driving the winch drum, i. e. from the propeller shaft of the truck. The method therein illustrated avoids the necessity of additional bearings and universals which would normally be necessary to overcome the pull of the drive which causes a spring or whip of the shaft under load. In Figure 3, a form of drive is shown in section which avoids this tension on the shaft without intrducing any changes in the shaft construction. The side pull of the chain 55 driven by the spocket 60 and driving the sprocket 19 is not transmitted to the propeller shaft 61. The shaft 61 passes through the sleeve 62 which is bored large enough to clear the angularity or normal whip of the shaft. The outer surface of the sleeve 62 is splined or otherwise constructed to drive the outer sleeve 63 in which the sleeve 62 is slidable. The outer sleeve 63 carries the sprocket 60, and is rotatably mounted in the bracket 64 and held in place by the cap 65. The said bracket 64 is mounted on the winch tie bar 66. The sliding sleeve 62 is provided with a clutch member 67 which engages with a coacting clutch member 68, fast to the propeller shaft 61. The other end of the sliding sleeve is provided with a circumferential groove 69 which is engaged by the shifter fork 70, fulcrumed in the bracket 71. The end of the clutch fork lever is connected to the operating pedal 72 by the rod and clevises 74. The pedal 72 is fulcrumed in the bracket 73. For ease of assembly and construction, the sleeves may be split although this is not essential.

The main engine transmission 61$^a$ is located to the rear of the truck, as is very common, and the winch may be driven without driving the truck, by putting the said transmission in neutral. To apply this method of driving from the shaft to a truck with its transmission forward, it is but necessary to supply an additional clutch to disconnect the rear end from the shaft.

In the bracket 73 is also fulcrumed the winch speed gear shifting lever 75, which is connected by the rod and clevises 76 to the lever 77 which is fast on the tube 78 (see Figs. 1 and 2). The said tube 78 has fast upon it, on the other end, the lever 79, which actuates the lever 80, by means of the rod 81 (see also Fig. 6). The lever 80 is fastened to the outer end of the rock shaft 82 which passes through the cover 83 of the gear housing. The inner end of the rock shaft 82 is connected to the lever 21 (see Fig. 5) which actuates the shifter fork 20 which slides the speed gears 16 and 17 upon the spline shaft 14. For the purpose of holding the gears in the desired position, the outer end of the lever 80 is provided with a spring pin 84 (Fig. 7) which engages the depressions 85, provided in the cover 83.

When it is desired to drive the winch from the power take-off shaft of the engine transmission, the sprocket 86 (see Fig. 14) associated with the clutch jaws 87 is loosely mounted on the shaft. The clutch member 89, driven by the power take off shaft 88, by means of the key 90, is slidable upon the power take off shaft. The said clutch member 89 is operated by means of lever 91, operated in turn by the rod 92 which is connected to the operating lever in the cab. The sprocket 86 is caused to rotate by engaging the clutch members. The sprocket drives the chain 93, which in turn drives the sprocket 19, which is on the end of the spline shaft, passing thru the rear of the gear housing, the spline shaft having been turned end for end.

In the modification shown in Fig. 15 the speed change gearing is housed in a separate housing 94 and the worm and worm gear are also housed in a separate housing 95. The sprocket 98, at the end of the worm shaft 99 is driven via the chain 97 by the sprocket 96 which in turn is driven in either of the methods used to drive the preferred construction illustrated in Figures 3 and 14.

It should be noticed that the particular advantage of the worm and worm gear drive is that it allows for a positive locking means for the drum in a position, preventing the slipping of the drum when the gears are in neutral. However additional ratchet locking means may be provided on the drum.

It will be apparent many modifications and substitutions may be made in the construction illustrated and described, without departing from the spirit of the invention. The described modifications being but illustrative and the preferred application of my invention, Which I claim is, 1. In a unitary variable speed winch structure adapted to be moved as a unit, a winch drum, a driving shaft for said drum, a gear on said shaft, an auxiliary shaft, a plurality of gears of different pitch diameters on said shaft, one of said gears meshing with said gear on the drum driving shaft, a third shaft, a plurality of companion gears thereon adapted to mesh with certain of the gears on said auxiliary shaft, a reversing idler gear adapted to mesh with certain of the gears on said auxiliary shaft and said third shaft, means for selectively meshing certain of the gears on said auxiliary shaft with certain of the others gears, a housing enclosing said gears, side frames for said winch, said housing forming part of said side frames.

2. A unitary variable speed winch adapted to be moved as a unit comprising a drum, a drum shaft, a worm gear on said shaft, a worm shaft, a worm on said worm shaft, gears of different pitch diameters on said worm shaft, a shaft parallel to said worm shaft, companion gears on said last shaft adapted to mesh with certain of the gears on said worm shaft, a reverse idler gear adapted to mesh with certain of the gears on the worm shaft and on the shaft parallel to the worm shaft, means for selectively meshing said gears on the parallel shaft with certain of the other gears.

3. In a unitarily constructed variable speed winch adapted to be moved as a unit, the combination of a winch drum, a driving shaft for said winch drum, a worm gear on said shaft, a worm shaft, a worm on said shaft to drive said worm gear, a plurality of gears of different pitch diameters on said worm shaft, a shaft parallel to said worm shaft, companion gears on said latter shaft adapted to mesh with certain gears on said worm shaft, a reverse idler gear adapted to mesh with certain gears on said worm shaft and on said shaft parallel to said worm shaft, means for selectively meshing the gears on said latter parallel shafts, a housing enclosing all of the aforementioned gears, bearings in said housing, said housing forming a side frame for said winch, a second side frame, and a base connecting said side frames.

4. A unitary variable speed winch structure adapted to be moved as a unit, comprising side frame members and means for tying said members together, a winch drum, a winch drum shaft supported by said side frames, means for driving said drum at different speeds and in opposite directions, a closure enclosing said latter means, said closure forming part of the side frames.

5. The combination of a motor vehicle comprising a chassis, a source of motive power operatively connected to a change speed transmission and a unitarily constructed variable speed winch mounted on said chassis and adapted to be dismounted from said chassis as a unit, said winch comprising a winch drum, a winch drum shaft, supporting means for said drum and drum shaft comprising side frames and tie members for said side frames, bearings in said side frames, said shaft passing through said bearings, means for releasably connecting said drum to said shaft, a worm gear on said drum shaft, a worm to drive said worm gear, means mounted on said support for driving said worm at different speeds and in opposite directions, comprising change speed and reverse gears, means for enclosing all of the said gears, and means for transmitting power from said source of motive power to said winch drum.

ROBERT S. BOLGER.